(12) United States Patent
Saeki

(10) Patent No.: US 9,065,333 B2
(45) Date of Patent: Jun. 23, 2015

(54) DC-DC CONVERTER, CONTROL CIRCUIT AND INFORMATION PROCESSING SYSTEM

(75) Inventor: Mitsuo Saeki, Nerima (JP)

(73) Assignee: FUJITSU LIMITED, Kawasaki (JP)

(*) Notice: Subject to any disclaimer, the term of this patent is extended or adjusted under 35 U.S.C. 154(b) by 351 days.

(21) Appl. No.: 13/493,413

(22) Filed: Jun. 11, 2012

(65) Prior Publication Data
US 2013/0049716 A1 Feb. 28, 2013

(30) Foreign Application Priority Data
Aug. 31, 2011 (JP) ................... 2011-188253

(51) Int. Cl.
H02M 3/156 (2006.01)
H02M 3/157 (2006.01)
H02M 1/00 (2007.01)

(52) U.S. Cl.
CPC .............. H02M 3/156 (2013.01); *Y02B 70/16* (2013.01); *H02M 2001/0032* (2013.01)

(58) Field of Classification Search
CPC .............................. H02M 3/156; H02M 3/157
USPC .................. 323/282, 283, 284, 285
See application file for complete search history.

(56) References Cited

U.S. PATENT DOCUMENTS

| | | | |
|---|---|---|---|
| 2002/0080631 A1 | 6/2002 | Kanouda et al. | |
| 2003/0151933 A1* | 8/2003 | Haraguchi et al. | 363/41 |
| 2007/0216387 A1* | 9/2007 | Matsuo et al. | 323/282 |
| 2009/0058388 A1* | 3/2009 | Kanakubo | 323/288 |
| 2009/0174379 A1* | 7/2009 | Lima et al. | 323/282 |
| 2009/0218999 A1* | 9/2009 | Kikuchi | 323/282 |
| 2011/0025673 A1* | 2/2011 | Chen et al. | 345/211 |
| 2011/0062930 A1* | 3/2011 | Houston et al. | 323/284 |

FOREIGN PATENT DOCUMENTS

| | | |
|---|---|---|
| JP | 2002-199708 A | 7/2002 |
| JP | 2005-168129 A | 6/2005 |
| JP | 2010-051066 A | 3/2010 |

OTHER PUBLICATIONS

Office Action of Japanese Patent Application No. 2011-188253 dated Feb. 17, 2015 with Partial Translation.

* cited by examiner

*Primary Examiner* — Timothy J Dole
*Assistant Examiner* — Sisay G Tiku
(74) *Attorney, Agent, or Firm* — Maschoff Brennan

(57) ABSTRACT

A DC-DC converter includes: an inductor provided between a power input node and a power output node; a plurality of switching elements which switch an input route of a power toward the inductor and a discharge route of the power from the inductor; a first pulse generation circuit which generates a first pulse based on a feed-back signal according to an output of the output node; a second pulse generation circuit which generates a second pulse having a second frequency being equal to or higher than a first frequency set as an upper limit of a human audible frequency band; a driver which drives the switching element based on one of the first pulse and the second pulse; and a control circuit which supplies the first pulse or the second pulse to the driver based on a load state of a load coupled to the output node.

16 Claims, 13 Drawing Sheets

DC-DC CONVERTER, CONTROL CIRCUIT AND INFORMATION PROCESSING SYSTEM

CROSS-REFERENCE TO RELATED APPLICATIONS

This application is based upon and claims the benefit of priority from the prior Japanese Patent Application No. 2011-188253 filed on Aug. 31, 2011, the entire contents of which are incorporated herein by reference.

FIELD

The embodiments discussed herein are related to a DC-DC converter, a control circuit and an information processing system.

BACKGROUND

An electronic apparatus may include a DC-DC converter (switching regulator) that generates a voltage which is higher or lower than an output voltage of a battery. The output voltage of the battery varies depending on a left amount of stored power.

An external power source such as an AC adaptor outputs a fixed voltage. The DC-DC converter generates a fixed output voltage even if an input voltage varies.

A method for controlling a switching element of the DC-DC converter includes a Pulse Width Modulation (PWM) method and a Pulse Frequency Modulation (PFM) method. According to the PWM method, the output voltage of the DC-DC converter is compared to a reference voltage as a target value, and a pulse width of a drive signal varies in such a way that an error voltage is minimized. When a switching frequency is set to be fixed and a duty ratio of ON-time of the switching element varies, a voltage rise rate varies depending on the input voltage so that the output voltage is maintained fixed.

According to the PFM method, to obtain excellent conversion efficiency in a low load state in which a load current is reduced, the switching frequency varies depending on the stage of the load. In the low load state, switching operation of the switching element stops for a predetermined period, and a consumed power (consumed current) is reduced.

To avoid noises, the switching frequency may be excluded from a human audible frequency band, for example, several tens of Hz to 20 kHz.

The related technique is disclosed in Japanese Laid-open Patent Publication No. 2005-168129 and the like.

SUMMARY

According to one aspect of the embodiments, a DC-DC converter includes: an inductor provided between a power input node and a power output node; a plurality of switching elements which switch an input route of a power toward the inductor and a discharge route of the power from the inductor; a first pulse generation circuit which generates a first pulse based on a feed-back signal according to an output of the output node; a second pulse generation circuit which generates a second pulse having a second frequency being equal to or higher than a first frequency set as an upper limit of a human audible frequency band; a driver which drives the switching element based on one of the first pulse and the second pulse; and a control circuit which supplies the first pulse or the second pulse to the driver based on a load state of a load coupled to the output node.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF THE EMBODIMENTS

Figure 1:
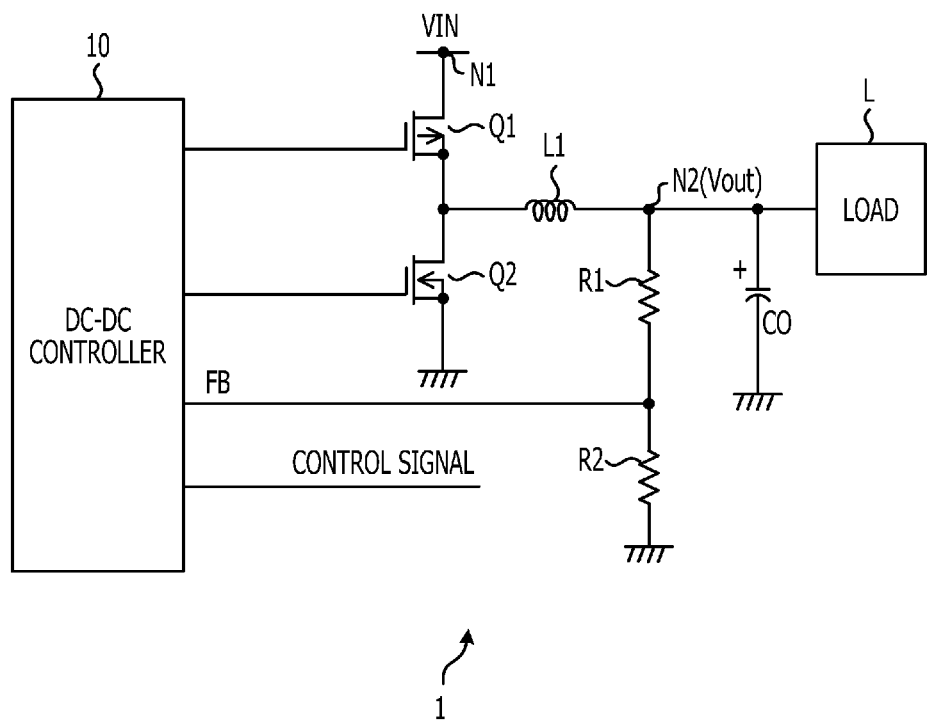
FIG. 1 illustrates an exemplary DC-DC converter.

A method for controlling a switching element of a DC-DC converter includes a Pulse Width Modulation (PWM) method and a Pulse Frequency Modulation (PFM) method. According to the PWM method, an output voltage of the DC-DC converter is compared to a reference voltage as a target value, and a pulse width of a drive signal varies in such a way that an error voltage is minimized. When a switching frequency is set to be fixed and a duty ratio of ON-time of the switching element varies, a voltage rise rate varies depending on an input voltage so that the output voltage is maintained fixed.

According to the PFM method, to obtain excellent conversion efficiency in a low load state in which a load current is reduced, the switching frequency varies according to the stage of the load. In the low load state, switching operation of the switching element stops for a certain period, and a consumed power (consumed current) is reduced.

To reduce noise, the switching frequency may not include a human audible frequency band, for example, a frequency of several tens of Hz to 20 kHz.

If the switching frequency does not include the human audible frequency band, the efficiency in the low load state may be reduced. For example, since the switching element operates at the frequency of 20 kHz or higher in the low load state, the consumed power of the switching element may increase.

A DC-DC converter 1 is embedded in a personal computer or an information processing device, such as various server devices to supply a desired power voltage. The switching frequency of the switching element in the DC-DC converter 1 may not be included in the human audible frequency band. For example, the lower limit of the human audible frequency band may be 20 Hz, and the upper limit of the human audible frequency band may be 20 kHz. The DC-DC converter 1 operates the switching element at the frequency of 20 kHz or higher in a high load state and at the frequency of 20 Hz or lower in the low load state. For example, in the DC-DC converter 1, the switching element operates at the frequency of 20 Hz or lower in the low load state in which the load current is low. If the load is increased, the switching element operates at the frequency of 20 kHz or higher. Therefore, while the human audible frequency band is avoided and the efficiency of the low load state is increased, appropriate operation may be performed when the load is increased.

The DC-DC converter 1 may use a control signal for entering to the low load state such as a suspend state or a sleep state of the information processing device. In the low load state, power is supplied to some of devices and electronic circuits mounted on the information processing device, and the power is not supplied to the rest of the devices and electronic circuits. Therefore, in the low load state, the power current amount (power amount) of the information processing device may be reduced in, for example, a power saving mode compared to a normal mode, for example. The information processing device may desire an output of small current in the low load state. The control signal may indicate that the information processing device operates at the small output current. The DC-DC converter 1 may detect the low load state based on the control signal. Therefore, the DC-DC converter 1 may include a relatively simple circuit.

FIG. 1 illustrates an exemplary DC-DC converter. The DC-DC converter 1 illustrated in FIG. 1 includes a DC-DC controller 10. The DC-DC controller 10 drives a PMOS transistor Q1, as a high-side switch provided between an input node N1 (a node to which an input voltage VIN is applied) and a load L, and an NMOS transistor Q2, as a low-side switch provided between the load L and a ground. An inductor L1 is provided between the input node N1 and an output node N2. The PMOS transistor Q1 and the NMOS transistor Q2 switch an input route of a power to the inductor L1 and a discharge route of the power from the inductor L1. An output voltage Vout (the voltage of the output node N2 coupled to the load L) is obtained from a common drain of the transistors through an LC filter that includes the inductor L1 and a capacitor C0. The PMOS transistor Q1 and the NMOS transistor Q2 may correspond to a plurality of switching elements. A signal FB obtained by dividing the output voltage Vout by a resistance R1 and a resistance R2, for example, a feed-back signal FB returns to the DC-DC controller 10. The DC-DC controller 10 controls ON/OFF of the transistor Q1 and the transistor Q2 based on the feed-back signal FB and the certain control signal given from the information processing device.

Figure 2:
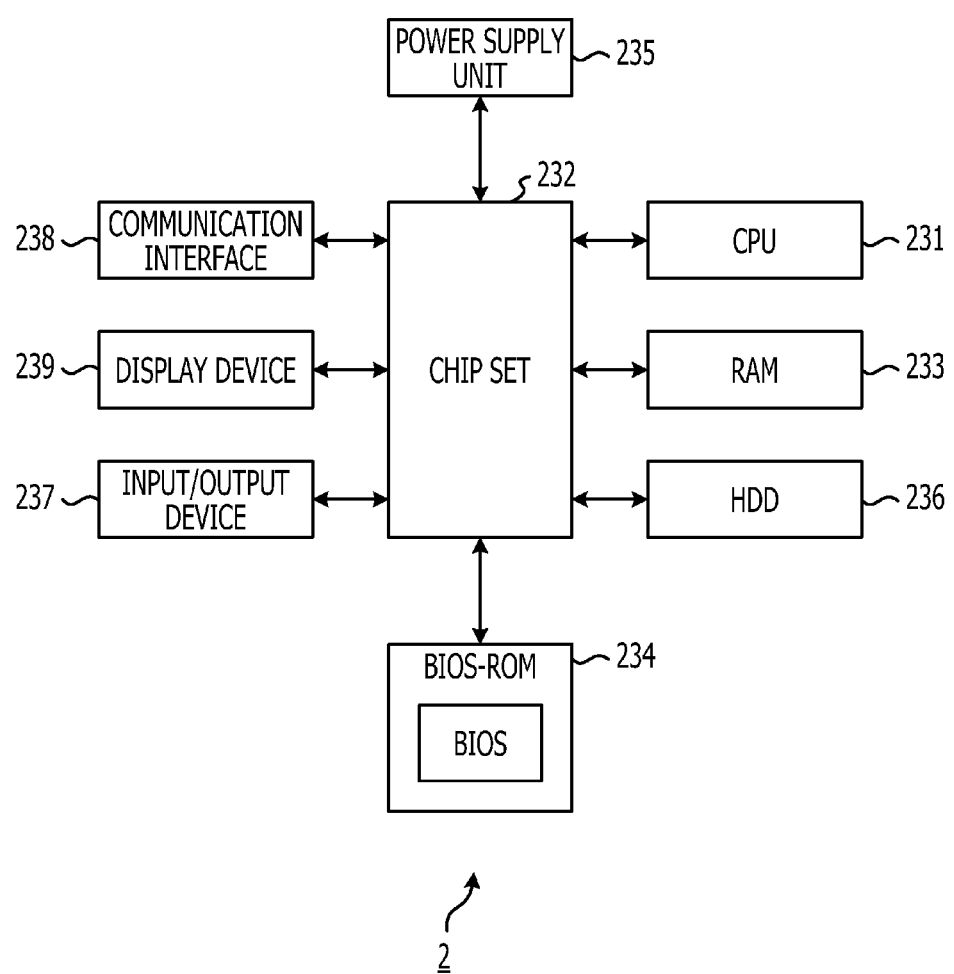
FIG. 2 illustrates an exemplary information processing device.

FIG. 2 illustrates an exemplary information processing device. The information processing device illustrated in FIG. 2 may include the DC-DC converter 1 illustrated in FIG. 1. The information processing device 2 includes a Central Processing Unit (CPU) 231, a chip set 232, a Random Access Memory (RAM) 233, a BIOS-ROM 234, a power supply unit 235, a Hard Disk Drive (HDD) 236, an input/output device 237, a communication interface 238, and a display device 239. The chip set 232 is coupled to the units inside the information processing device 2 by a data bus or a control bus. The DC-DC converter 1 may correspond to, for example, a part of the power supply unit 235 of the information processing device 2, and any of the units inside the information processing device 2 may correspond to the load of the DC-DC converter 1.

The CPU 231 may load and execute a program, which is stored in the HDD 236 corresponding to a non-volatile storage device when the information processing device 2 starts and is to be executed on an operating system (OS) or an OS, into the RAM 233. The RAM 233 may be a volatile storage device and may correspond to a main memory of the CPU 231. The program is loaded into the RAM 233, and the RAM 233 may temporally store the data referred to by the CPU 231. The chip set 232 may include a control circuit as an interface between the CPU 231 and another unit or a register used to control the units. The chip set 232 may correspond to a General Purpose Interface (GPI) as a general interface, for example. The BIOS-ROM 234 stores a Basic Input/Output System (BIOS). The BIOS may be a basic input/output system (program) that performs basic input/output processing to/from hardware. The communication interface 238 includes an interface circuit that performs communication with another device (not illustrated) via the Internet or Local Area Network (LAN). The display device 239, which includes, for example, a Liquid Cristal Display (LCD) monitor with a thin-film transistor provided by a pixel unit in a matrix form and a drive circuit that drives the thin-film transistor, displays image data given from the CPU 231 on a monitor.

The power supply unit 235 supplies power to the units inside the information processing device 2. The DC-DC converter 1 may correspond to a part of the power supply unit 235. According to the normal mode or the power saving mode, for example, the suspend mode or the sleep mode, the chip set 232 supplies a control signal that controls a power supply state of the units inside the information processing device 2 to the power supply unit 235. For example, the information processing device 2 may be in a power saving state. For example, the control signal obtained when the output of the DC-DC converter 1 is in the low load state may be a suspend signal. The suspend signal may be at a high level in a non-suspend mode and at a low level in the suspend mode. The suspend signal may be a logic signal.

Figure 3:
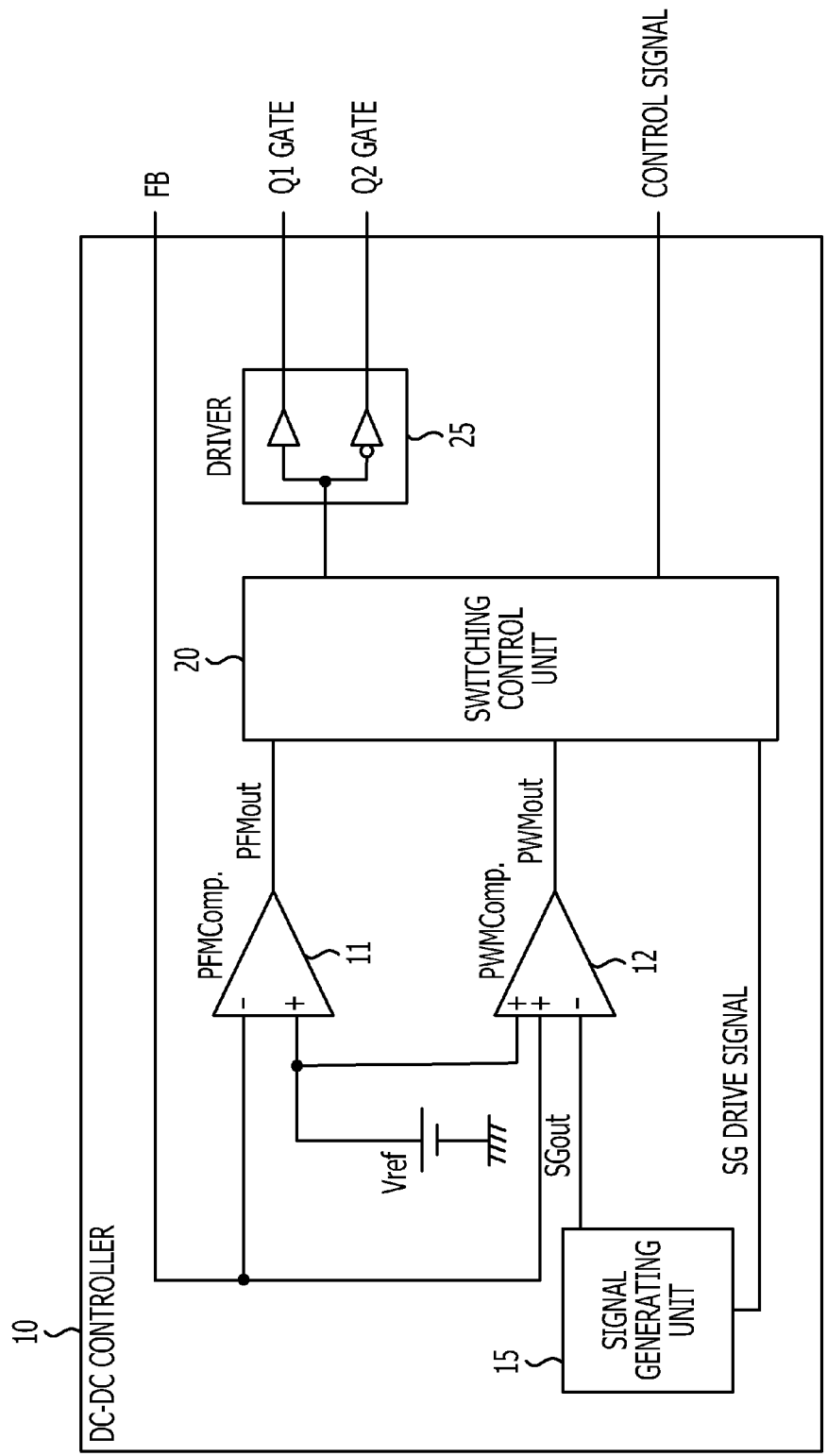
FIG. 3 illustrates an exemplary DC-DC controller.

FIG. 3 illustrates an exemplary DC-DC controller. The DC-DC controller 10 includes a PFM comparator 11, a PWM comparator 12, a signal generating unit 15, a switching control unit 20, and a driver 25. The PFM comparator 11 may correspond to a first pulse generating unit. The PWM comparator 12 may correspond to a second pulse generating unit. Regarding the DC-DC controller 10, a reference voltage Vref is input into a non-inverting input terminal of the PFM comparator 11, and the feed-back signal FB is input into an inverting input terminal of the PFM comparator 11. The PFM comparator 11 may constantly operate regardless of a logic level of the suspend signal. When the PWM comparator 12 generates a pulse, the PFM comparator 11 may stop the operation.

The reference voltage Vref is input into a first non-inverting input terminal of the PWM comparator 12, the feed-back signal FB is input into a second non-inverting input terminal, and a triangular wave signal SGout generated by the signal generating unit 15 is input into the inverting input terminal. When an SG drive signal from the switching control unit 20 is at an a high level, the signal generating unit 15 supplies the triangular wave signal SGout having the frequency to the PWM comparator 12. Therefore, the PWM comparator 12 operates.

When the voltage of the triangular wave signal SGout decreases from the maximum value to the minimum value, an output signal PWMout of the PWM comparator 12 changes from a low level to a high level at a timing when the voltage of the triangular wave signal SGout becomes lower than the voltage of the feed-back signal FB. When the voltage of the triangular wave signal SGout increases from the minimum value to the maximum value, the output signal PWMout of the PWM comparator 12 changes from a high level to a low level at the timing when the voltage of the triangular wave signal SGout becomes higher than the reference voltage Vref. The switching frequency in the PWM operation may be set based on the frequency of the triangular wave signal SGout. The frequency of the triangular wave signal SGout may be set to be 20 kHz or higher specified as the upper limit of the human audible frequency band.

If the SG drive signal from the switching control unit 20 is at a low level, the signal generating unit 15 supplies the output signal SGout having a predetermined voltage that is the reference voltage Vref or lower, for example, a ground voltage to the PWM comparator 12. The PWM comparator 12 stops.

Based on the frequency of the control signal (suspend signal) or the output signal PFMout of the PFM comparator 11, the switching control unit 20 supplies the output signal PFMout of the PFM comparator 11 or the output signal PWMout of the PWM comparator 12 to the driver 25. The driver 25 generates the output signal of each comparator by amplifying the signal having the voltage to drive at least the PMOS transistor Q1 and the NMOS transistor Q2 and drives each transistor. The signal PFMout may correspond to a first pulse, and the signal PWMout may correspond to a second pulse.

Figure 4:
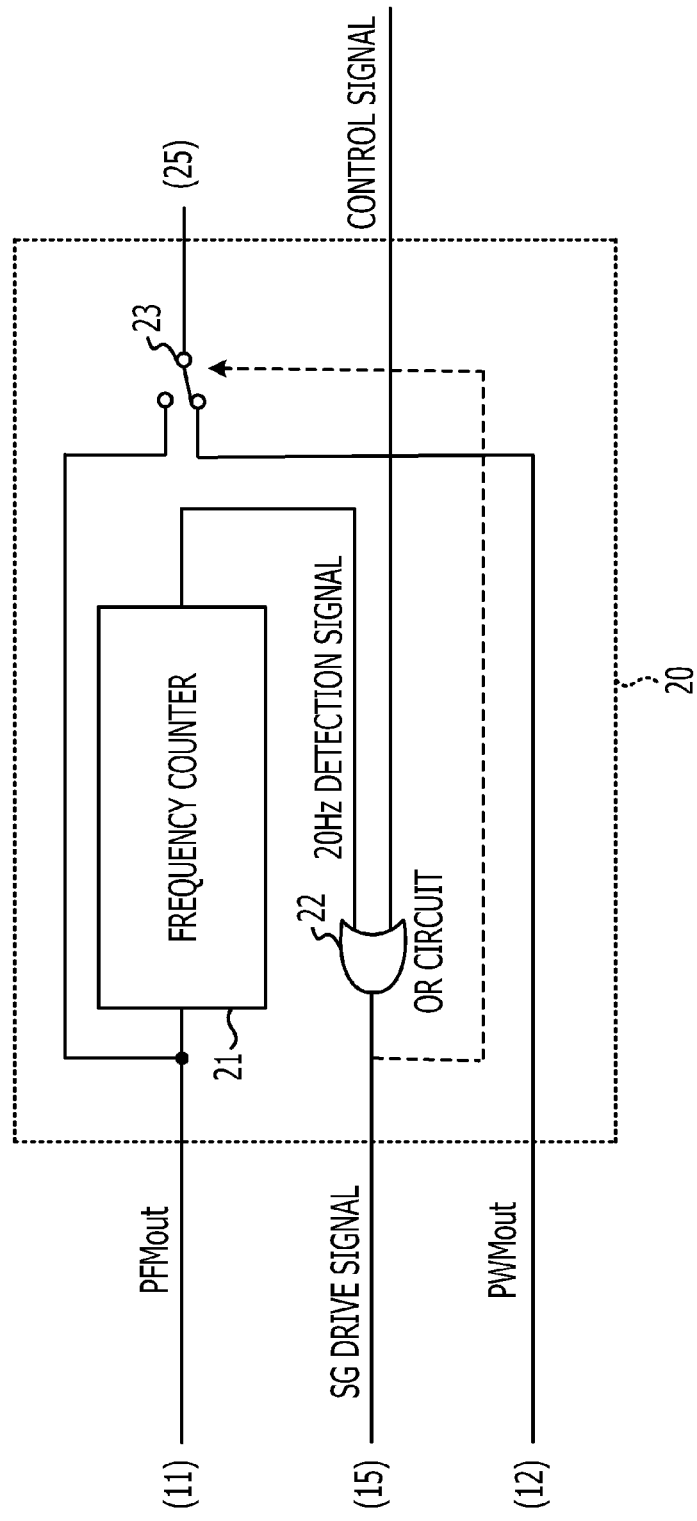
FIG. 4 illustrates an exemplary switching control unit.

FIG. 4 illustrates an exemplary switching control unit. The switching control unit illustrated in FIG. 4 is provided inside the DC-DC controller 10. The switching control unit 20 includes a frequency counter 21, an OR circuit 22, and a switch 23. The frequency counter 21 counts the frequency of the output signal PFMout of the PFM comparator 11 and then outputs a 20 Hz detection signal as a detection signal according to the counting result. The 20 Hz detection signal may be a logic signal that becomes a high level when the frequency of the output signal PFMout of the PFM comparator 11 exceeds 20 Hz and becomes a low level when the frequency of the output signal PFMout does not exceed 20 Hz.

Figure 5:
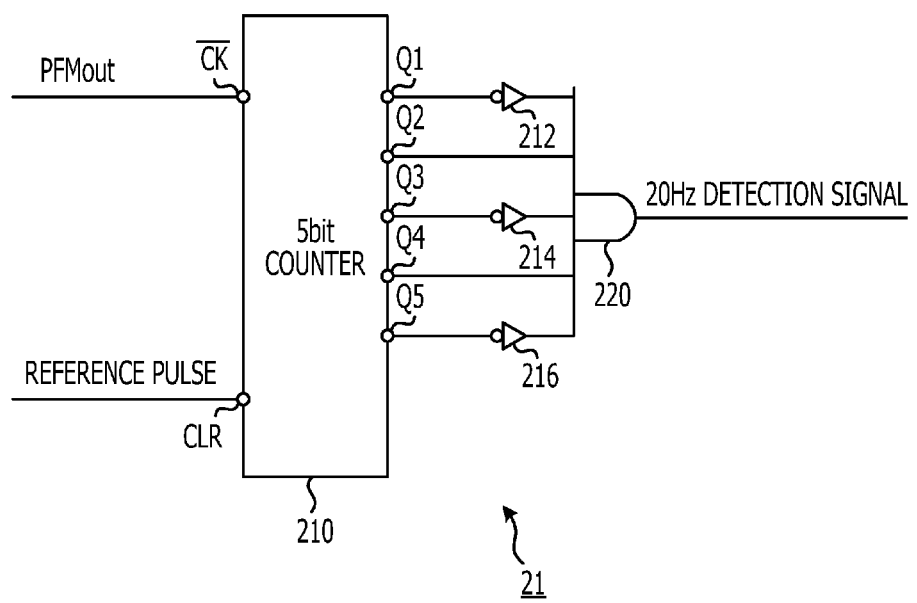
FIG. 5 illustrates an exemplary frequency counter.
Figure 6:
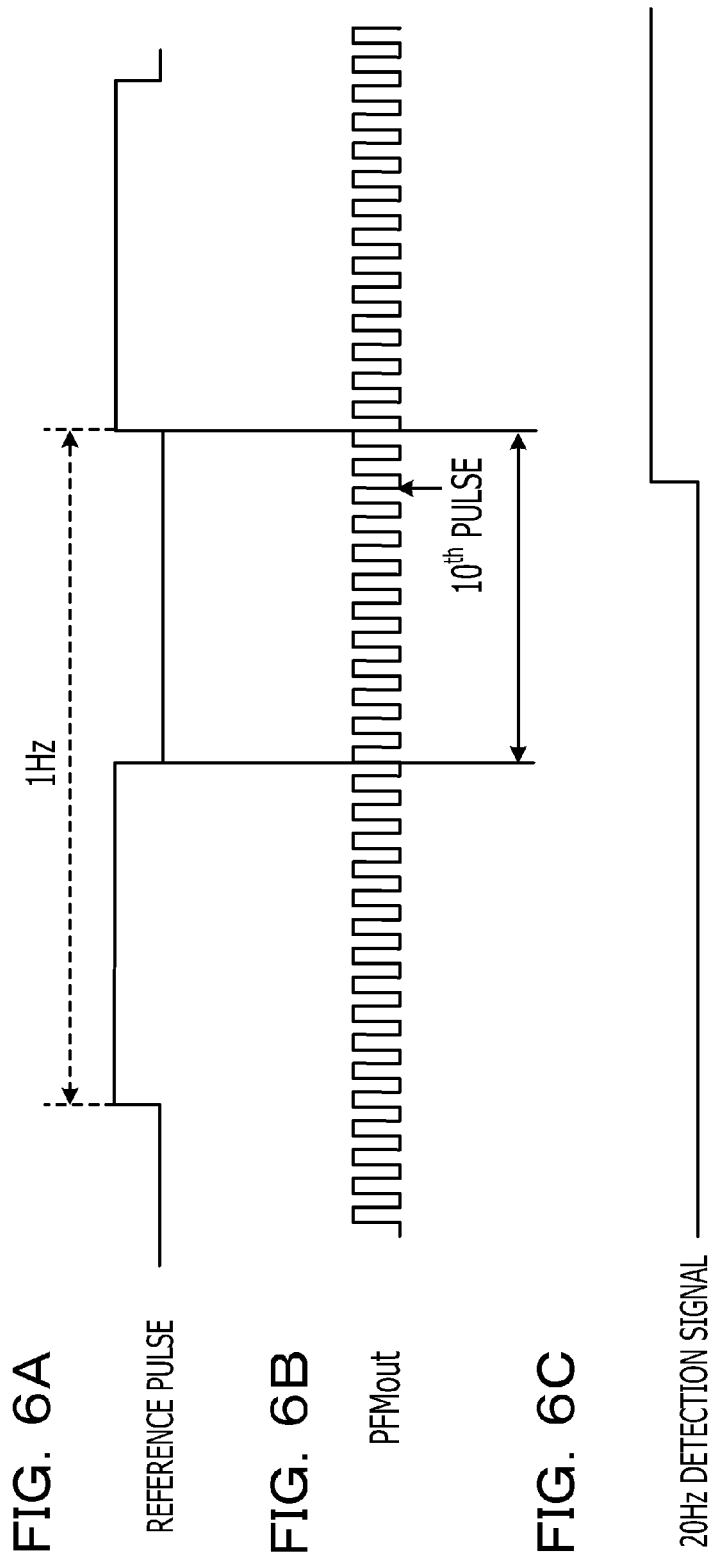
FIGS. 6A to 6C illustrate an exemplary operation of a frequency counter.
Figure 7:
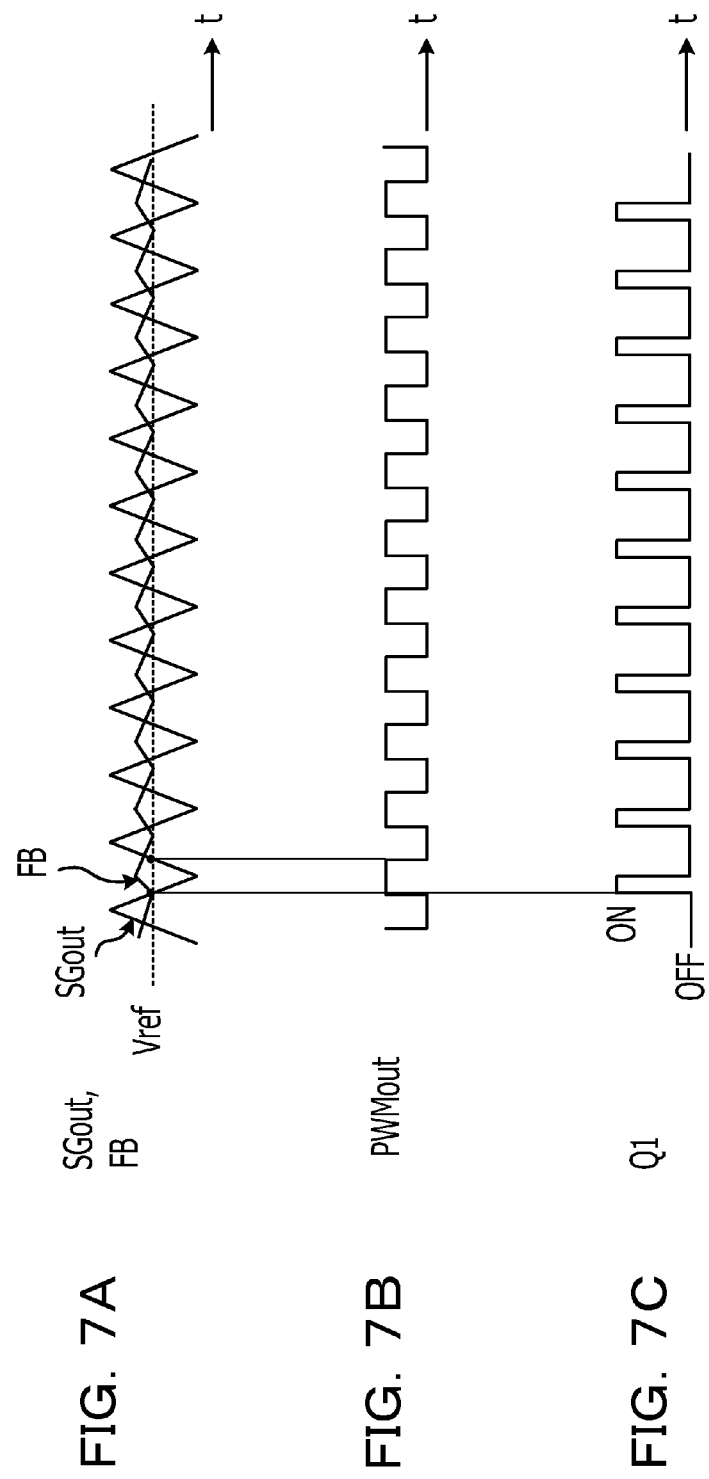
FIGS. 7A to 7C illustrate an exemplary operation of a DC-DC converter.

FIG. 5 illustrates an exemplary frequency counter. FIGS. 6A to 6C illustrate an exemplary operation of the frequency counter. The frequency counter 21 illustrated in FIG. 5 includes a 5 bit counter 210, inverters 212, 214, and 216, and an AND circuit 220. The 5 bit counter 210 may be a general binary counter, for example. The 5 bit counter 210 includes a CK terminal with an upper bar, a reset terminal CLR, and output terminals Q1 to Q5. As illustrated in FIG. 6A, in the 5 bit counter 210, a reference pulse of 1 Hz is input into the CLR terminal. The counter is reset at a timing of fall of the reference pulse, and all the output terminals Q1 to Q5 become a low level. The output signal PFMout of the PFM comparator 11 is input into the CK terminal with an upper bar. The 5 bit counter 210 counts up at the timing of fall of the signal PFMout, and the binary count value is output to the output terminals Q1 to Q5. As illustrated in FIG. 6, for example, when ten pulses are counted, the output terminals Q1, Q2, Q3, Q4, and Q5 become a low level, a high level, a low level, a high level, and a low level, respectively. All the input terminals (5 terminal input) of the AND circuit 220 are at the high level through the inverters 212, 214, or 216. Therefore, as illustrated in FIG. 6C, the 20 Hz detection signal as the output signal of the AND circuit 220 becomes the high level. The frequency counter 21 may detect that the frequency of the output signal PFMout of the PFM comparator 11 is 20 Hz or lower. The detection may be performed by another configuration or method.

The OR circuit 22 of the switching control unit 20 illustrated in FIG. 4 outputs the SG drive signal by ORing the 20 Hz detection signal output from the frequency counter 21 and the SG drive signal (suspend signal) input from the outside. For example, regarding the SG drive signal, the SG drive signal at the high level may be output when the output signal PFMout of the PFM comparator 11 is 20 Hz or higher or when the information processing device 2 is in the non-suspend mode. According to the output logic level of the OR circuit 22, the switch 23 outputs the output signal PFMout of the PFM comparator 11 or the output signal PWMout of the PWM comparator 12 to the driver 25.

FIGS. 7A to 7C, 8A to 8C, 9A, and 9B illustrate an exemplary operation of a DC-DC converter. FIG. 7 illustrates switching operation in a case where the DC-DC converter 1 performs PWM operation. FIG. 8 illustrates the switching operation in a case where the DC-DC converter 1 performs PFM operation. FIG. 9 illustrates the switching operation in a case where the load changes when the DC-DC converter 1 performs the PFM operation.

As illustrated in FIGS. 7A to 7C, when the PWM operation is performed, the PWM comparator 12 may perform the following operation. For example, as illustrated in FIGS. 7A and 7B, when the voltage of the triangular wave signal SGout falls from the maximum value to the minimum value, the output signal PWMout of the PWM comparator changes from a low level to a high level at the timing when the voltage of the triangular wave signal SGout becomes lower than the voltage of the feedback signal FB. When the voltage of the triangular wave signal rises from the minimum value to the maximum value, the output signal PWMout of the PWM comparator 12 changes from a high level to a low level at the timing when the voltage of the triangular wave signal SGout becomes higher than the reference voltage Vref. The ON-time of the PMOS transistor Q1 illustrated in FIG. 7C may be fixed based on an input/output voltage.

Figure 8:
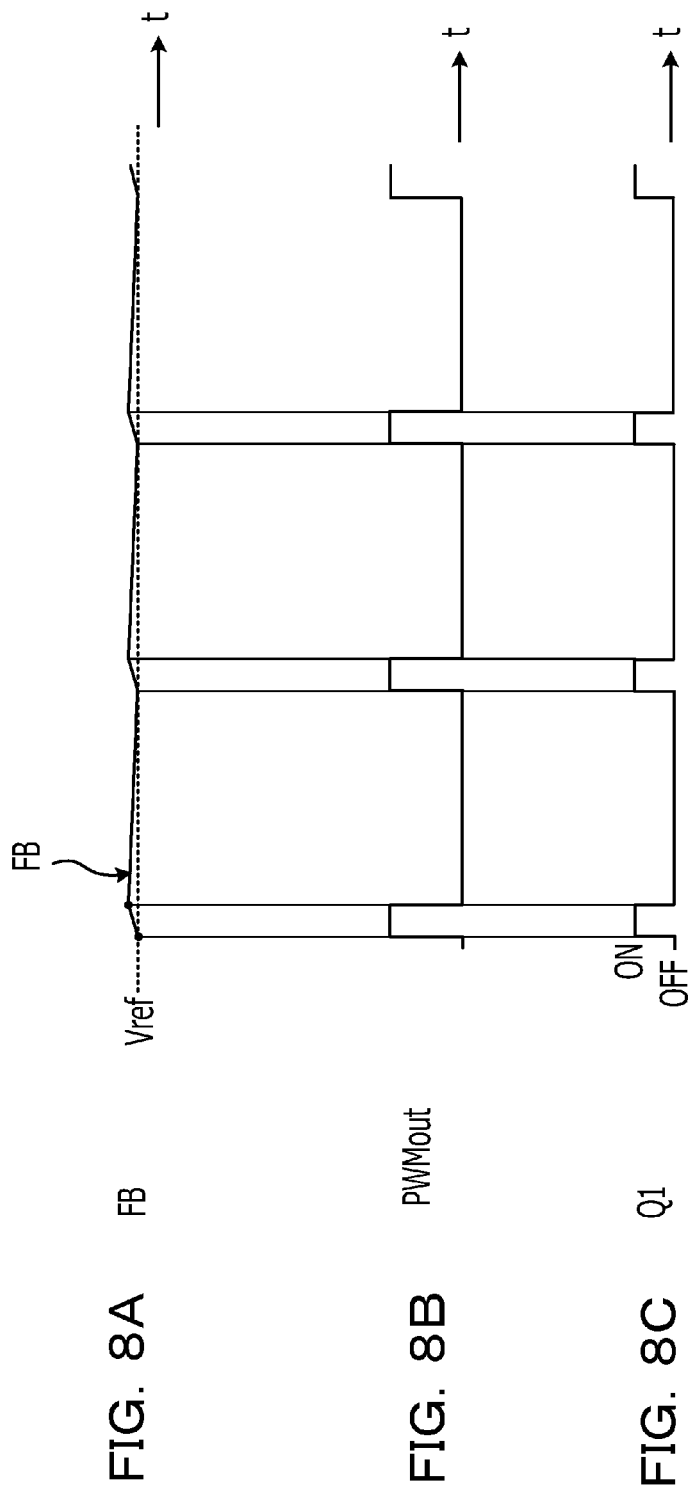
FIGS. 8A to 8C illustrate an exemplary operation of a DC-DC converter.

As illustrated in FIGS. 8A to 8C, when the PFM operation is performed, the PFM comparator 11 compares the reference voltage Vref to the feedback signal FB and outputs the signal PFMout (pulse signal) based on the comparison result. At the time t1 illustrated in FIG. 8, when the feedback signal FB that is returned from the output side of the DC-DC converter is lower than the reference voltage Vref, the output signal PFMout of the PFM comparator 11 changes from a low level to a high level, and the PMOS transistor Q1 changes to ON from OFF. When the PMOS transistor is turned ON and when the output voltage Vout of the DC-DC converter 1 increases, the voltage level of the feedback signal FB increases, and the output signal PFMout of the comparator 11 changes from a high level to a low level at a time t2. The load stored in the capacitor C0 is consumed and decreased as the load current. At a time t3, the operation that is substantially the same as the operation at the time t1 is performed. In the PFM operation, the above-described operation of the times t1 to t3 may be repeated.

As illustrated in FIGS. 9A and 9B, the switching operation in a case where the load current is large may be different from the switching operation in a case where the load current is small. Since the load stored in the capacitor C0 is not consumed as the load current when the load current is small as compared to the case where the load current is high, the gradient of the fall of the feedback signal FB becomes gentle. Therefore, if the load current is small, the interval of the timing at which the PMOS transistor Q1 is turned ON becomes longer compared to the case where the load current is large. If the load current is increased, the pulse of the output PFMout of the PFM comparator 11 and the frequency of the switching of the PMOS transistor Q1 are increased. If the capacity of the capacitor C0 on the output side is increased, the switching frequency in the PFM operation may be set to 20 Hz or lower. However, the circuit size may increase or the cost may increase. According to the detection result of the frequency of the output signal PFMout of the PFM comparator 11, the PWM/PFM operation is switched. The drive transistor may include a combination of the PMOS transistor Q1 and the NMOS transistor Q2 or may have another configuration.

Figure 10:
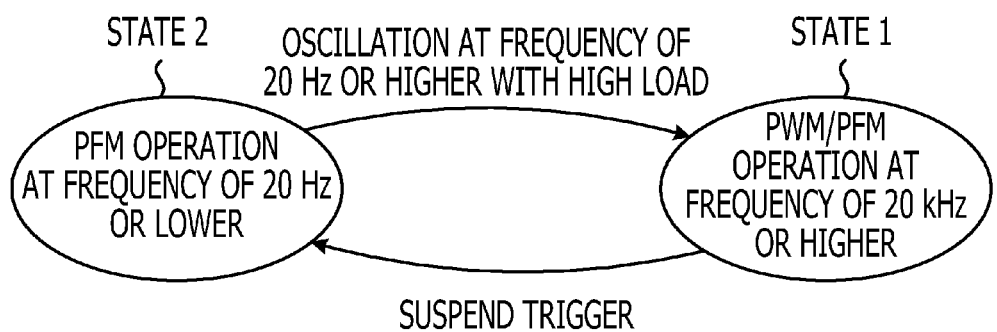
FIG. 10 illustrates an exemplary state transition of a DC-DC converter.

FIG. 10 illustrates an exemplary state transition of a DC-DC converter. FIG. 11A to FIG. 11D illustrate an exemplary operation of a DC-DC converter. As illustrated in FIG. 10, the DC-DC converter 1 may transit between a state 1 as the PWM/PFM operation of the switching frequency of 20 kHz or higher and a state 2 as the PFM operation of the switching frequency of 20 Hz or lower.

Figure 11:
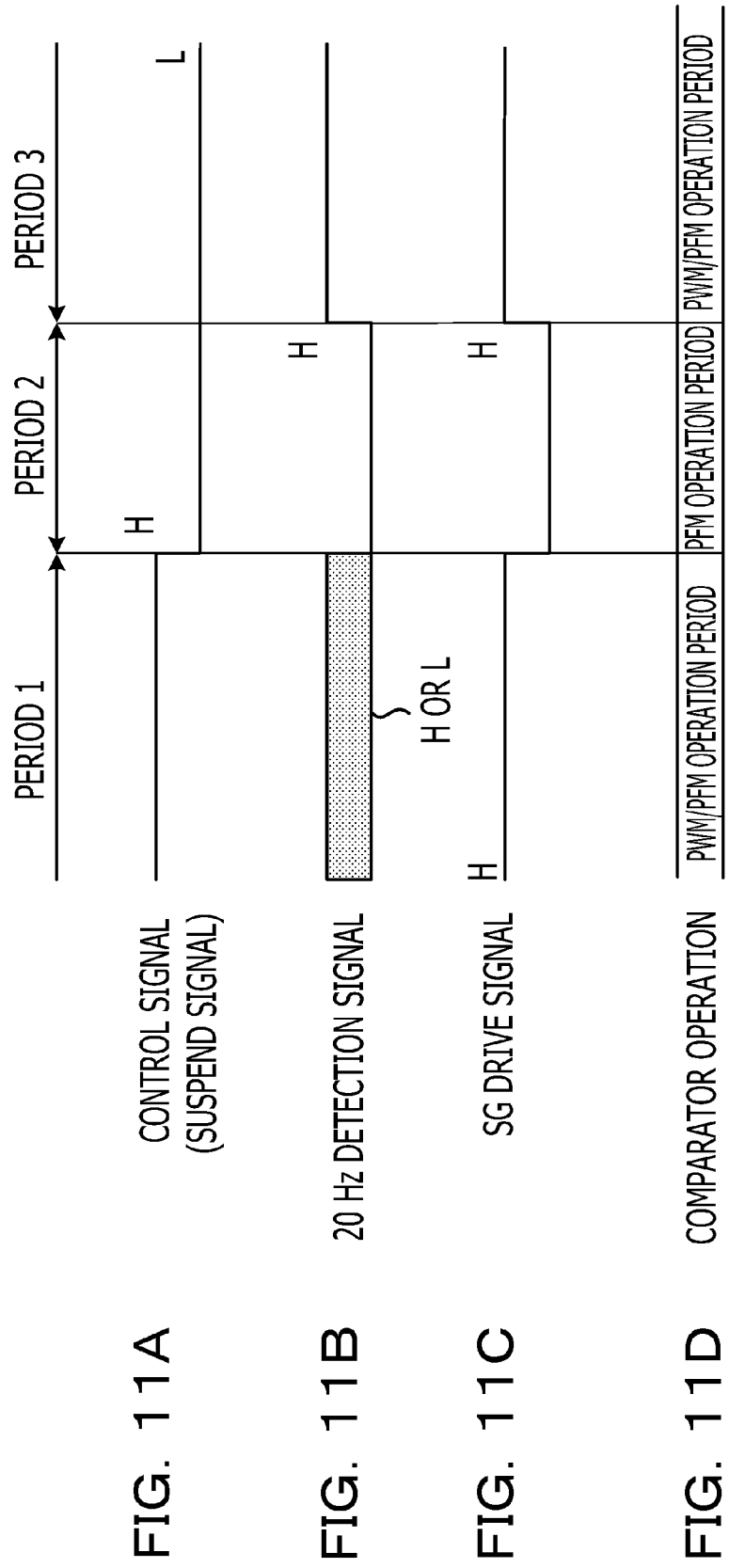
FIGS. 11A to 11D illustrate an exemplary operation of a DC-DC converter.

In a period 1 illustrated in FIG. 11, an information processing device 1 operates in a normal mode, and a control signal (suspend signal) is at a high level (non-suspend mode). The SG drive signal as an output of the OR circuit 22 becomes a high level, the signal generating unit 15 supplies the output signal SGout as a triangular wave signal of a predetermined frequency to the PWM comparator 12, and the PWM comparator 12 operates. The PFM comparator 11 may operate constantly. The period 1 may correspond to the PWM/PFM operation period, for example, the state 1 illustrated in FIG. 10. In the PWM/PFM operation period, even though the PWM operation and the PFM operation are performed, the PWM/PFM operation period may be controlled by the PWM operation with a high frequency. In the PWM/PFM operation period, the DC-DC converter 1 operates at a fixed switching frequency of 20 kHz or higher out of the human audible frequency band. The 20 Hz detection signal may become a high level or a low level according to the frequency of the output signal PFMout of the PFM comparator 11.

Figure 9:
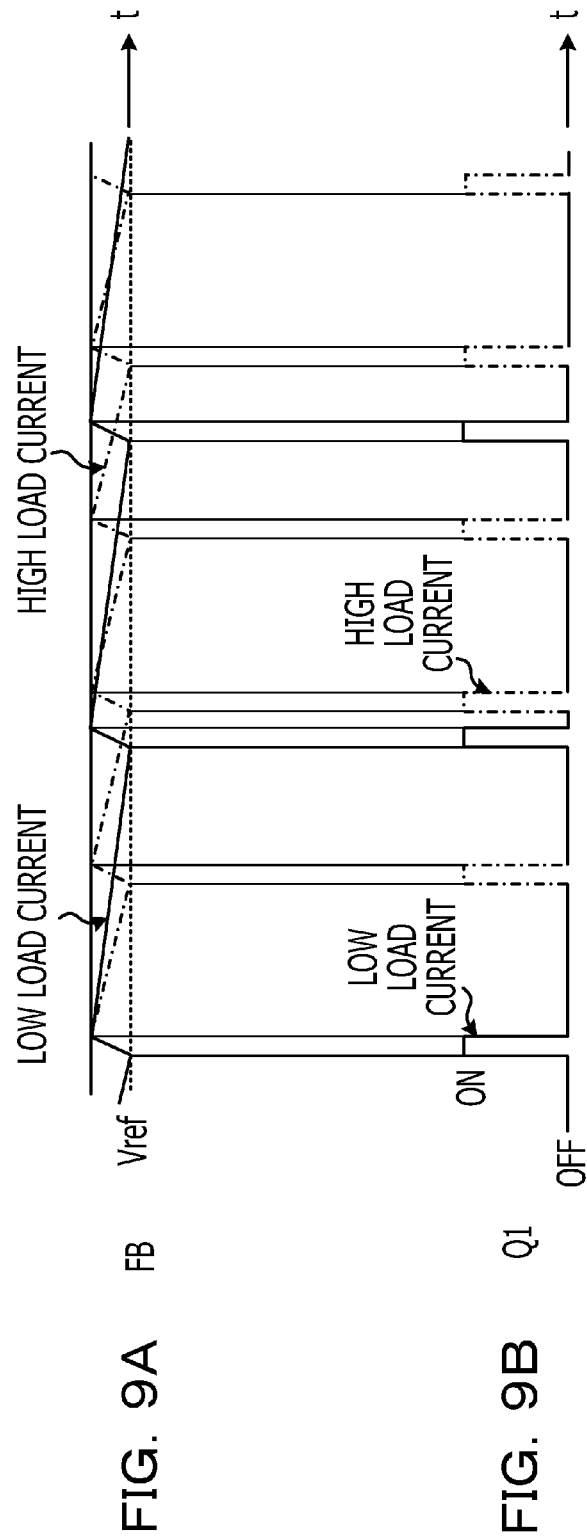
FIGS. 9A and 9B illustrate an exemplary operation of a DC-DC converter.

In the period 2 illustrated in FIG. 11, the information processing device 2 changes from the normal mode to the suspend mode, and the control signal (suspend signal) becomes a low level (suspend mode). At the beginning of the period 2, the output may be in the low load state. Based on the variation of the control signal (suspend signal) to the low level, for example, a suspend trigger illustrated in FIG. 10, the SG drive signal as an output of the OR circuit 22 becomes a low level. The output signal SGout as a fixed voltage that is the reference voltage Vref or lower, for example, the ground voltage is supplied to the PWM comparator 12. Therefore, the PWM comparator 12 may stop. The PFM comparator 11 may operate constantly. The period 2 may correspond to the PFM operation period, for example, the state 2 illustrated in FIG. 10. In the PFM operation, as illustrated in FIG. 9, since the switching is performed according to the load current, the switching operation may be performed effectively.

The load may increase in the middle of the operation of the period 2. For example, when the information processing device 2 is in the suspend mode, an external memory (for example, a Universal Serial Bus (USB) memory or the like) may be inserted into a USB port. Even though the information processing device 2 is in the suspend mode, the load of the DC-DC converter 1 may increase. The beginning of the period 3 illustrated in FIG. 11 may be a timing when the load of the DC-DC converter 1 increases. When the switching frequency increases according to the increase of the load and when the frequency of the pulse signal PFMout as the output of the PFM comparator 11 reaches 20 Hz, the 20 Hz detection signal of the frequency counter 21 changes to a high level, and the SG drive signal as the output of the OR circuit 22 becomes a high level. Like the period 1, the period 3 after the load increases may be in the PWM/PFM operation period, for example, the state 1 illustrated in FIG. 10.

For example, in the DC-DC converter 1 illustrated in FIG. 1, the switching element performs the PWM operation at the frequency of 20 kHz or higher in the high load state in which the information processing device 2 is in the normal mode, and the switching element performs the PFM operation at the frequency of 20 Hz or lower in the low load state in which the information processing device 2 is in the suspend mode. The DC-DC converter 1 may avoid the human audible frequency band, so that the efficiency in the low load state may increase. The load that increases from the low load state in which the information processing device 2 is in the suspend mode is detected by the frequency of the PFM pulse. When the switching frequency exceeds the value that is set as the lower limit of the human audible frequency band, the switching element performs the PWM operation. For example, the DC-DC converter 1 illustrated in FIG. 1 may avoid the human audible frequency band, so that the efficiency of the low load state may increase. Thus, the DC-DC converter may operate properly when the load increases.

The DC-DC converter illustrated in FIG. 1 may be a voltage controlled DC-DC converter that performs the switching operation by returning the output voltage to the DC-DC controller 10. A current controlled DC-DC converter that performs the switching operation by returning the output voltage to the DC-DC controller 10 may be employed. The circuit of the voltage controlled DC-DC converter and the circuit of current controlled DC-DC converter may be substantially the same or similar to each other. The similar elements of the above-described circuits have the similar numerals, so that the description may be omitted or reduced.

Figure 12:
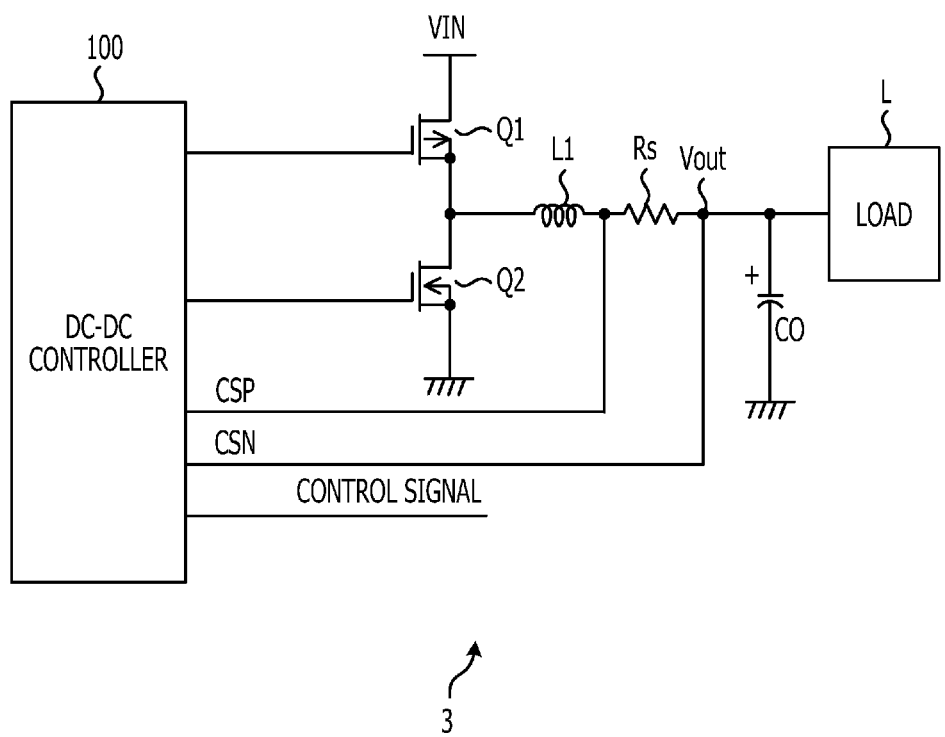
FIG. 12 illustrates an exemplary DC-DC converter.
Figure 13:
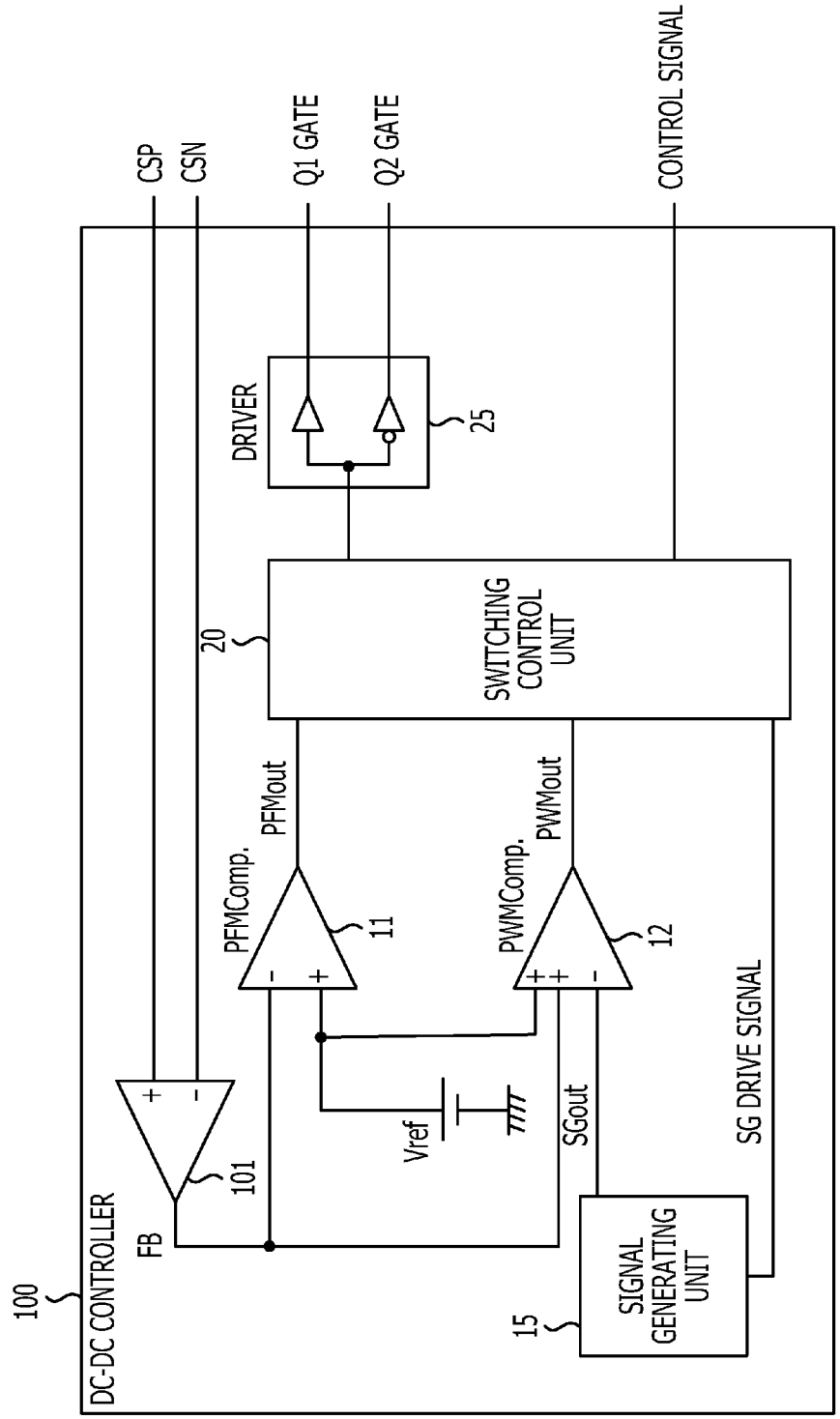
FIG. 13 illustrates an exemplary DC-DC controller.

FIG. 12 illustrates an exemplary DC-DC converter. The DC-DC converter 3 illustrated in FIG. 12 includes a sense residence Rs that is used to detect the load current. A voltage CSP and a voltage CSN of the nodes at both edges of the sense residence Rs return to the DC-DC controller 10. FIG. 13 illustrates an exemplary DC-DC controller. A DC-DC controller 100 includes an operational amplifier 101 that amplifies a difference voltage between the voltage CSP and the voltage CSN. The operational amplifier 101 amplifies the difference voltage between the voltage CSP and the voltage CSN to generate the feedback signal FB and then supplies the feedback signal FB to the inverting input terminal of the PFM comparator 11 and to the non-inverting input terminal of the PWM comparator 12. The feedback signal FB may be substantially the same as the feedback signal FB illustrated in FIG. 1, for example. The operation of the DC-DC converter illustrated in FIG. 12 may be substantially the same as or similar to the operation of the DC-DC converter 1 illustrated in FIG. 1.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. A DC-DC converter, comprising:
   an inductor provided between a power input node and a power output node;
   a plurality of switching elements which switch an input route of a power toward the inductor and a discharge route of the power from the inductor;
   a first pulse generation circuit which generates a first pulse signal based on a feed-back signal according to an output of the output node;

a second pulse generation circuit which generates a second pulse signal having a second frequency being equal to or higher than a first frequency set as an upper limit of a human audible frequency band;

a driver which drives a switching element based on one of the first pulse signal and the second pulse; and a control circuit which switches between supplying the first pulse signal or the second pulse signal to the driver based on a load state of a load coupled to the output node by controlling a triangular wave signal to be supplied to the second pulse generation circuit, wherein the controller supplies the first pulse to the driver by supplying the triangular wave signal to the second pulse generation circuit and supplies the second pulse to the driver by supplying a given voltage to the second pulse generation circuit.

2. The DC-DC converter according to claim 1, wherein the control circuit supplies the second pulse to the driver when the load is not in a low load state and supplies the first pulse to the driver when the load is in the low load state.

3. The DC-DC converter according to claim 1, wherein the DC-DC converter supplies the second pulse to the driver when the frequency of the first pulse becomes the second frequency or higher in a low load state.

4. The DC-DC converter according to claim 1, wherein the control circuit supplies the first pulse signal or the second pulse signal to the driver based on a control signal indicating a load state of the load.

5. The DC-DC converter according to claim 4, wherein the control signal includes a signal indicating a transition to a suspend state of the load or a signal indicating the transition to a sleep state of the load.

6. The DC-DC converter according to claim 1, comprising a detection circuit which detects a load state of the load.

7. The DC-DC converter according to claim 6, wherein the control circuit supplies the first pulse signal or the second pulse signal to the driver based on a detection result of the detection circuit.

8. The DC-DC converter according to claim 1, wherein the load is an information processing device.

9. The DC-DC converter according to claim 1, wherein the control circuit supplies the first pulse signal or the second pulse signal to the driver based on a signal indicating a transition to a suspend state of the load or a signal indicating the transition to a sleep state of the load.

10. A control circuit which controls a DC-DC converter, wherein the DC-DC converter includes:
   an inductor provided between a power input node and a power output node;
   a plurality of switching elements which switch an input route of a power to the inductor and a discharge route of the power from the inductor; and
   a detection circuit which detects an output current from a processing device coupled to the output node,
   wherein the control circuit includes:
   a first signal generation circuit which generates a first signal;
   a second signal generation circuit which generates a second signal at a second frequency which is equal to or higher than the frequency set as an upper limit of an human audible frequency band; and
   a controller which controls the DC-DC converter based on one of the first signal and the second signal according to a detection result of the detection circuit and selects one of the first signal and the second signal by controlling a triangular wave signal to be supplied to the second signal generation circuit, wherein the control circuit supplies the first signal to a driver by supplying the triangular wave signal to the second signal generation circuit and supplies the second signal to the driver by supplying a given voltage to the second signal generation circuit.

11. The control circuit according to claim 10, wherein the first signal generation circuit generates the first signal by a frequency modulating method and the second signal generation circuit generates the second signal by the frequency modulating method.

12. The control circuit according to claim 10, wherein the controller operates the DC-DC converter based on the first signal when detecting that a current is output and operates the DC-DC converter based on the second signal when detecting that a signal period of the first signal corresponds to the frequency of the human audible frequency band.

13. The control circuit according to claim 10, wherein the controller supplies the first signal or the second signal to a driver based on a signal indicating a transition to a suspend state of a load or a signal indicating the transition to a sleep state of the load.

14. An information processing system, comprising:
   an information processing device;
   an inductor provided between a power input node and a power output node coupled to the information processing device;
   a plurality of switching elements which switch an input route of a power to the inductor and a discharge route of the power from the inductor;
   a first pulse generation circuit which generates a first pulse signal based on a feed-back signal according to an output of the output node;
   a second pulse generation circuit which generates, based on the feed-back signal, a second pulse signal having a second frequency being equal to or higher than a first frequency specified as an upper limit of an audible frequency band;
   a driver which drives a switching element based on one of the first pulse signal and the second pulse signal; and
   a control circuit which switches between supplying the first pulse or the second pulse to the driver based on a load state of the information processing device by controlling a triangular wave signal to be supplied to the second pulse generation circuit, wherein the control circuit supplies the first pulse to the driver by supplying the triangular wave signal to the second pulse generation circuit and supplies the second pulse to the driver by supplying a given voltage to the second pulse generation circuit.

15. The information processing system according to claim 14, wherein the control circuit supplies the second pulse to the driver when the information processing device is not in a low load state and supplies the first pulse to the driver when the information processing device is in the low load state.

16. The information processing system according to claim 14, wherein the control circuit supplies the first pulse signal or the second pulse signal to the driver based on a signal indicating a transition to a suspend state of the load or a signal indicating the transition to a sleep state of the load.

* * * * *